United States Patent [19]

Takahashi

[11] Patent Number: 4,961,229
[45] Date of Patent: Oct. 2, 1990

[54] SPEECH RECOGNITION SYSTEM UTILIZING IC CARDS FOR STORING UNIQUE VOICE PATTERNS

[75] Inventor: Tsutomu Takahashi, Tokyo, Japan

[73] Assignee: NEC Corporation, Tokyo, Japan

[21] Appl. No.: 383,255

[22] Filed: Jul. 21, 1989

Related U.S. Application Data

[63] Continuation of Ser. No. 911,146, Sep. 24, 1986, abandoned.

[30] Foreign Application Priority Data

Sep. 24, 1985 [JP] Japan .................................. 60-208721

[51] Int. Cl.$^5$ .............................................. G10L 5/06
[52] U.S. Cl. ...................................... 381/42; 235/380
[58] Field of Search ...................... 381/42; 364/513.5; 235/382, 382.5

[56] References Cited

U.S. PATENT DOCUMENTS 3,816,722 6/1974 Sakoe et al. .
4,189,712 2/1980 Lemelson ......................... 235/382 X
4,449,189 5/1984 Feix et al. ......................... 381/42 X
4,582,985 4/1986 Löfberg ............................... 235/380
4,590,604 5/1986 Feilchenfeld ......................... 381/42
4,653,097 3/1987 Watanabe et al. ..................... 381/42
4,827,518 5/1989 Feastel et al. ......................... 381/42

Primary Examiner—William M. Shoop, Jr.
Assistant Examiner—Marc S. Hoff
Attorney, Agent, or Firm—Foley & Lardner, Schwartz, Jeffery, Schwaab, Mack, Blumenthal & Evans

[57] ABSTRACT

A speech recognition system for identifying a person by his voice includes an IC card, an IC card reader, a microphone, an A/D converter, an analyzer, and a collating circuit. The IC card is carried by a person whose voice pattern is stored therein. The IC card reader reads out the voice pattern from the IC card. The microphone, the A/D converter, and the analyzer cooperate to extract an actual voice pattern of the person carrying the IC card. The collating circuit collates the voice pattern read out from the IC card with the actual voice pattern from the analyzer.

2 Claims, 2 Drawing Sheets

SPEECH RECOGNITION SYSTEM UTILIZING IC CARDS FOR STORING UNIQUE VOICE PATTERNS

This application is a continuation of application Ser. No. 06/911,146, filed Sept. 24, 1986 now abandoned.

BACKGROUND OF THE INVENTION

The present invention relates to a speech recognition system and, more particularly, to a speech recognition system for identifying a speaking person by his voice.

In a conventional speech recognition system, a password consisting of voice pattern data is prestored in a memory in a speech recognition system or terminal. Prior to utterance of a speaker, the corresponding voice pattern data is loaded from the memory to a pattern matching unit to determine whether the password uttered by a person is the one uttered by the right person.

It takes a long period of time to load the voice pattern data from the memory to the pattern matching unit prior to utterance of the speaker in a conventional speech recognition terminal of the type described above, and thus a host computer is overloaded. In addition, if the number of speaking persons is increased, the capacity of the memory must be increased. However, the memory capacity is limited, and the voice pattern maintenance is cumbersome, thus presenting various problems.

SUMMARY OF THE INVENTION

It is an object of the present invention to solve the conventional problems described above and to provide a speech recognition system, wherein high-speed voice pattern matching can be performed without overloading a host computer, a memory capacity need not be increased even if the number of speaking persons is increased, and easy maintenance can be achieved.

In order to achieve the above object of the present invention, there is provided a speech recognition system for identifying a person by his voice, comprising: an IC card, carried by a person, for storing his voice pattern; means for reading out the voice pattern from the IC card; means for extracting an actual voice pattern of the person carrying the IC card; and means for collating the voice pattern read out from the IC card with the actual voice pattern from the voice pattern extracting means.

DETAILED DESCRIPTION OF THE PREFERRED EMBODIMENT

Figure 1:
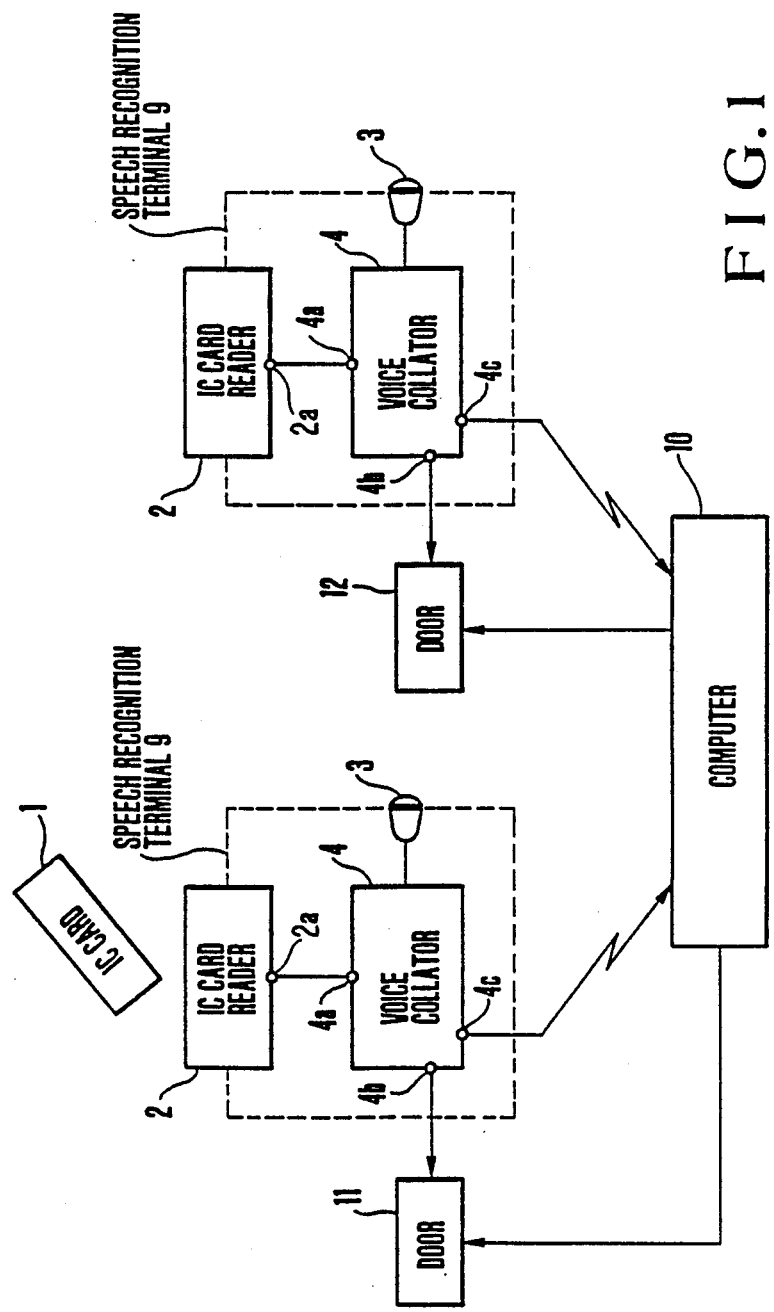
FIG. 1 is a block diagram showing an overall configuration of a speech recognition system according to an embodiment of the present invention.

FIG. 1 shows an overall configuration of a speech recognition system according to an embodiment of the present invention. Referring to FIG. 1, reference numeral 1 denotes an IC card for prestoring voice pattern data (e.g., feature parameters of 2 kbytes to 5 kbytes); 2, an IC card reader for reading the voice pattern data from the IC card 1 and generating an output at an output terminal 2a; 3, a microphone for receiving a voice of a speaker; and 4, a voice collator for comparing voice pattern data input from the IC card reader 2 to an input terminal 4a with an actual voice pattern input at the microphone 3 and for generating a comparison result from output terminals 4b and 4c. The IC card reader 2, the microphone 3, and the voice collator 4 constitute a speech recognition terminal 9. Two speech recognition terminals 9 are connected to a host computer 10 in FIG. 1. Opening/closing devices for opening doors 11 and 12 of confidential rooms are respectively connected to output terminals 4b of collators 4 of the speech recognition terminals 9.

The operation of the system in FIG. 1 will be described below.

Pattern data read from the IC card 1 by the IC card reader 2 is matched by the voice collator 4 with pattern data input at the microphone 3 in each terminal 9. A signal representing the comparison result is sent to the host computer 10. The host computer 10 designates opening of the door 11 or 12 of the confidential room in response to the signal from the corresponding terminal. In this case, the speaker can input voice at any one of the speech recognition terminals 9. In addition, the load of the host computer 10 is reduced since it only receives the comparison result. The number of IC card holders does not limit the scale of the system. A ten-key pad may be arranged on the IC card reader 2. An ID code entered with the ten-key pad is compared with that stored in the IC card to measure a similarity therebetween. A password may be easily replaced with a new one. In the above operation, a triple check is performed using an IC card with a large memory capacity, a voice pattern stored in the IC card, and a pattern of voice uttered by a person, thus improving confidentiality. In addition, since the reference speech pattern is stored in the IC card carried by the speaker, a distributed system can be designed to reduce the load of the host computer and to simplify the maintenance of the speech pattern.

Figure 2:
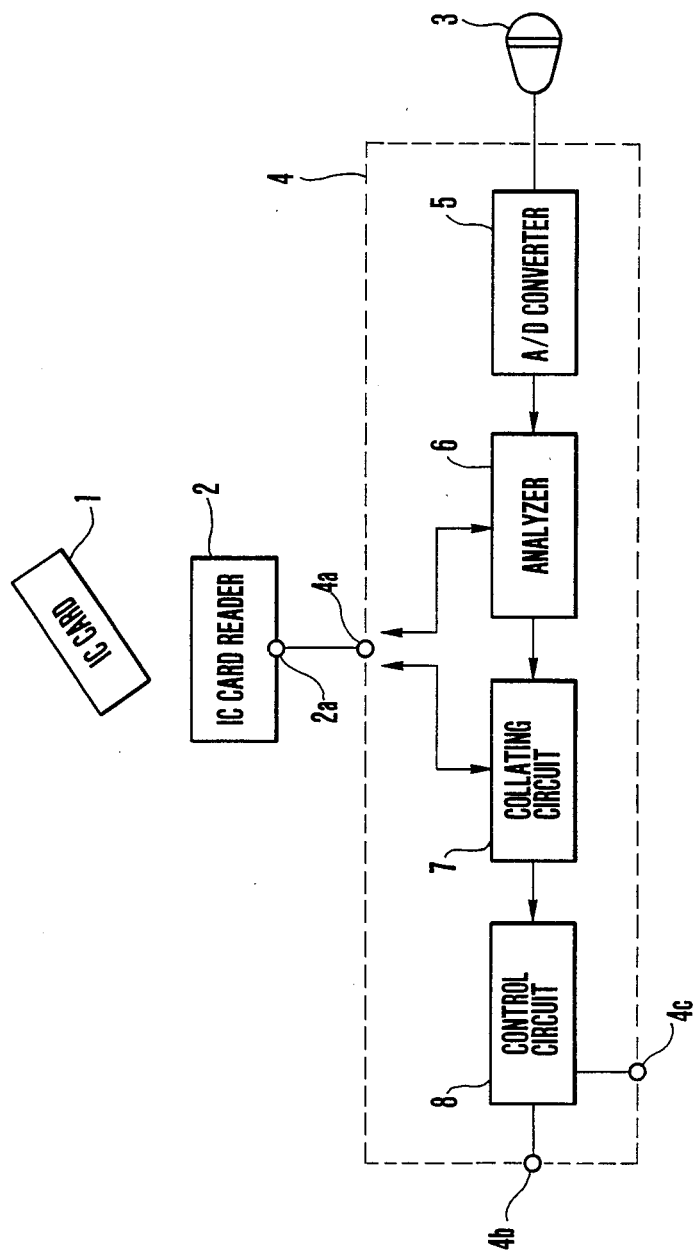
FIG. 2 is a block diagram of a speech recognition terminal in FIG. 1.

FIG. 2 shows a detailed arrangement of the voice collator 4 in FIG. 1. The voice collator 4 comprises an A/D converter 5, an analyzer 6, a collating circuit 7, and a control circuit 8.

The operation of the speech recognition terminal 9 having the arrangement described above will be described below. When the user inserts the IC card 1 into the IC card reader 2, the IC card reader 2 reads the voice pattern data from the IC card 1 and transmits it to the collating circuit 7 from an output terminal 2a at high speed. The voice pattern signal is also supplied to the analyzer 6. The analyzer 6 analyzes the waveform of the signal so that voice pattern parameters calculated by a pattern recognition scheme are sent to the collating circuit 7. The voice pattern parameter data is temporarily stored in the collating circuit 7. When the speaker utters a predetermined word or password at the microphone 3, the voice signal is converted into a digital signal by the A/D converter 5. The digital signal is sent to the analyzer 6 so that the waveform of the signal signal is analyzed. The voice pattern parameters calculated by the analyzer 6 are supplied to the collating circuit 7. The collating circuit compares the pattern data parameters transferred from the IC card reader 2 with the pattern data parameters transferred from the microphone 3 to calculate a similarity therebetween. The similarity data is compared with a predetermined threshold voltage to determine whether the voice is uttered by the registered person. The analysis of two voice patterns and the similarity measurement can be performed by techniques disclosed in U.S. Pat. No. 3,816,722.

The voice pattern parameters may vary according to the physical conditions of the speaker. In order to solve this problem, if the similarity between the parameter from the IC card reader 2 and the parameter from the microphone 3 falls outside a predetermined range, the current voice pattern parameters are sent from the analyzer 6 and registered in the IC card 1.

The collation result in the collating circuit 7 is supplied to the control circuit 8. The collation result is sent from an output terminal 4c to the host computer 10 and at the same time a motor control signal is sent to control the door (11 or 12) of the confidential room from the outer terminal 4b.

What is claimed is:

1. A speech recognition system for identifying a person by his voice, comprising:

an IC card carried by a person, for storing only his voice pattern;

means for reading out said voice pattern from said IC card;

means for extracting an actual voice pattern of said person carrying said IC card; and means for collating said voice pattern read out from said IC card with said actual voice pattern from said voice pattern extracting means;

wherein said actual voice pattern extracting means comprises a microphone, an A/D converter for converting a voice signal input at said microphone into a digital signal, and an analyzing means for analyzing an output signal from said A/D converter and detecting a voice pattern identification parameter;

said speech recognition system further comprising:

writing means for writing in said IC card an analysis result of said analyzing means which represents a result of the voice signal input at said microphone from said analyzing means, said writing replacing an old voice pattern stored in said IC card with a new voice pattern.

2. A speech recognition system for identifying persons by their respective voices, comprising:

an IC card associated with each of the persons for storing only their respective voice patterns;

an IC card reader for reading a voice pattern from said IC card inserted in said speech recognition system;

means for extracting an actual voice pattern of one of the persons associated with said inserted IC card;

an analyzer for analyzing an output signal from said IC card reader and detecting a voice pattern identification parameter, and for analyzing the extracted actual voice pattern and detecting an actual voice pattern identification parameter;

means for comparing the voice pattern read out from said IC card with the actual voice pattern from said means for extracting in order to determine whether the voice pattern and the actual pattern correspond to each other; and a writing unit for writing into said IC card an analysis result of said analyzer which represents a determination that a similarity between the voice pattern identification parameter and the actual voice pattern identification parameter falls outside a predetermined range, said writing replacing an old voice pattern stored in said IC card with a new voice pattern.

* * * * *